Dec. 25, 1962 J. E. OSTLINE 3,070,661

MEASURED SERVICE SYSTEM

Filed Dec. 4, 1959 3 Sheets-Sheet 1

INVENTOR.

John E. Ostline, deceased
by Mattie A. Ostline executrix by C. A. Gulbrandsen
Atty.

INVENTOR.
John E. Ostline, deceased
by Mattie A. Ostline, executrix
by C. A. Gulbransen
Atty.

INVENTOR.
John E. Ostline, deceased
by Mattie A Ostline, executrix
by C. A. Gullbrandsen
Atty.

United States Patent Office 3,070,661

Patented Dec. 25, 1962

3,070,661
MEASURED SERVICE SYSTEM

John E. Ostline, deceased, late of Elmwood Park, Ill., by Mattie A. Ostline, executrix, Elmwood Park, Ill., assignor to Automatic Electric Laboratories, Inc., a corporation of Delaware Filed Dec. 4, 1959, Ser. No. 857,377
12 Claims. (Cl. 179—8.5)

My invention relates in general to an improved measured service system, and more specifically to a party line metering system by means of which a two party message register service may be provided for local calls, in an area where directors and toll ticketing apparatus are provided for handling long distance calls, without requiring any change in the directors or other ticketing equipment.

The present arrangement is an improvement over the system shown in my prior U.S. Patent No. 2,849,536, granted August 26, 1958, which disclosed a message registering arrangement for operating the meters of certain individual lines for local calls only, in a system employing directors and toll ticketing apparatus for the handling of long distance calls. The improvement consists in adapting the system of the prior patent to the operation of the meters of two party lines in such a system.

The operation of the proper meters of two party lines is accomplished by providing a small group of common meter control relays or party identifying equipments, each adapted to be preselected for use and associated with the line finder of the system, only during the dialling of the first digit of a called number. The common equipment is then controlled by different numbers of ground impulses from so-called "Spotter" dials associated with the parties on the calling line to control selecting relays in the finder switch which determine which of the meters, associated with the calling line, will be operated.

The "Spotter" dials referred to are well-known in the art and one example of such dial is shown in my prior U.S. Patent No. 2,366,647, issued January 2, 1945. Such a dial is arranged with additional springs, operated during the transmission of the regular impulses, to ground both sides of the line without interfering with the usual opening and closing of the line by the regular impulse springs. In some party line metering systems the different parties on a line are provided with different "Spotter" dials each sending different numbers of ground impulses to select different meters. In the present case it is assumed that one of the parties on each party line is provided with a dial which sends two ground or spotter impulses each time it is operated and the other party has a dial which sends only one ground impulse.

As indicated above, the equipment shown in the accompanying drawings is quite similar to that shown in Patent No. 2,849,536 with the addition of party lines and the meter relay control equipment of FIG. 3 together with certain minor changes and additions to the finder circuit of FIG. 1.

The main feature of the invention therefore is the provision of a common equipment, associated with a calling line, only during the dialling of a first digit of the called number, to determine that only the meter of the calling party on a party line will be operated. Additional features of novelty provided in the accomplishment of the above feature will be apparent from the following detailed description of the invention, having reference to the accompanying three sheets of drawings, and in which:

FIG. 1 illustrates a 200 line finder switch of standard design, having access to party lines such as shown at 101 with parties 1 and 2 and connected to a primary selector 300 of FIG. 2 in the usual manner.

FIGURES 1, 2, and 3 are connected.

Figure 1:
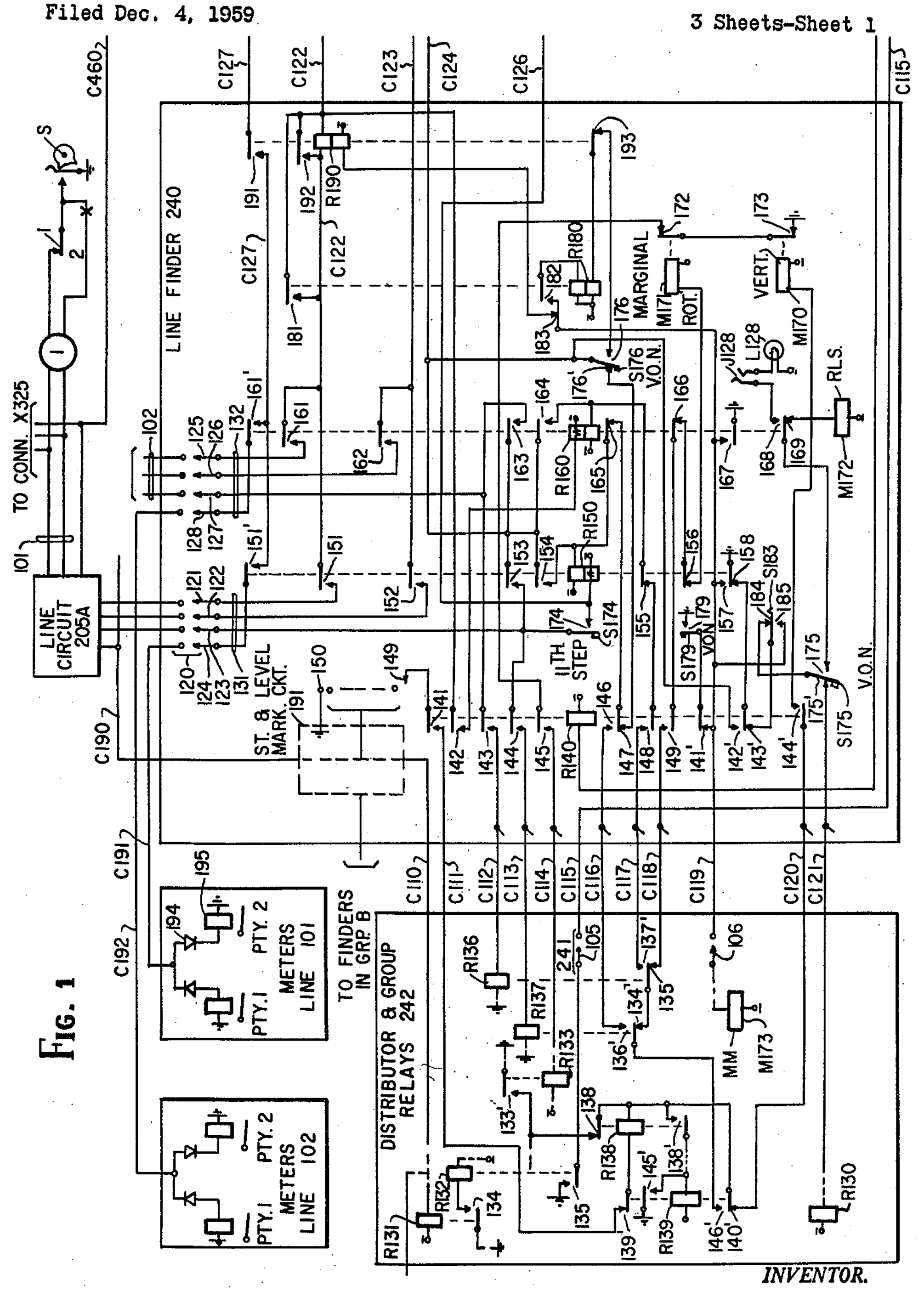
Figure 2:
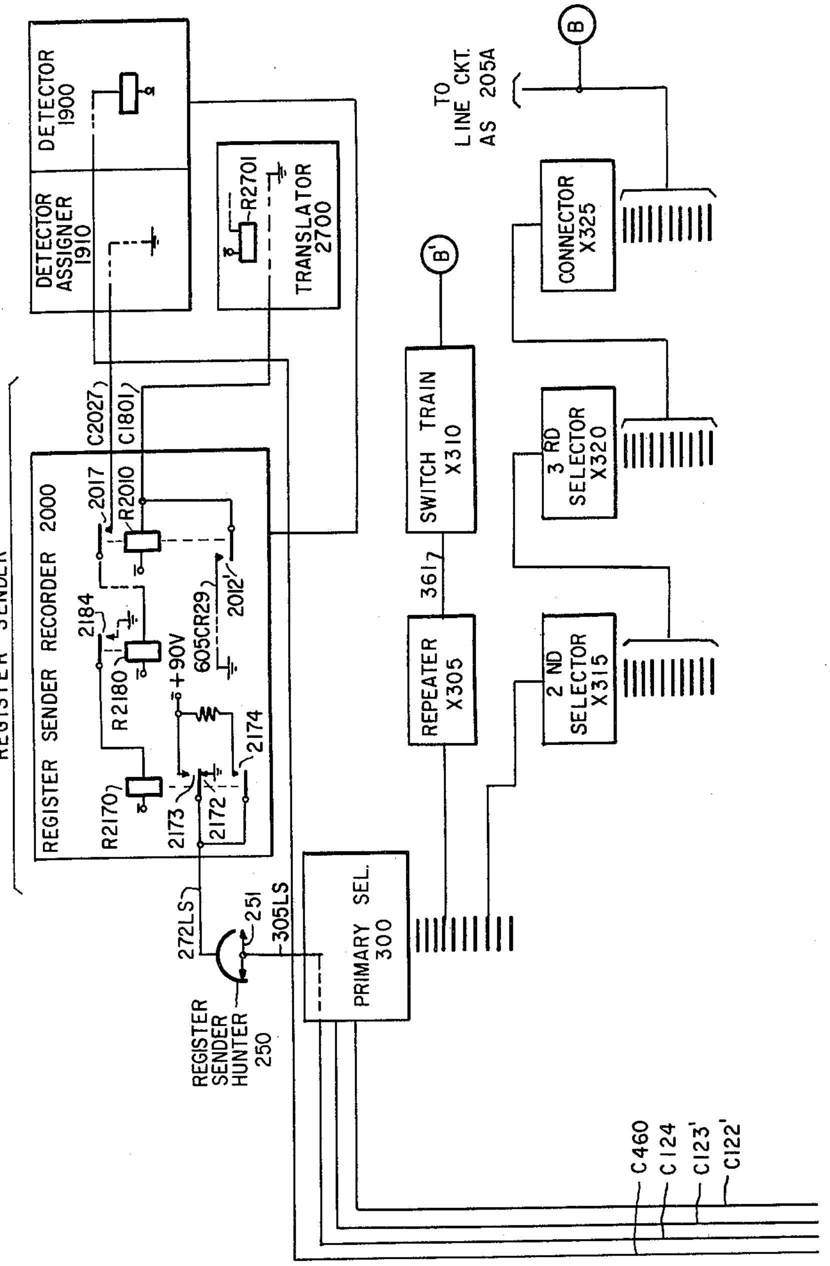
FIG. 2 shows by means of block diagrams the main components of an automatic telephone system in the same manner as such equipment was shown in my prior Patent No. 2,849,536 and in each diagram, sufficient elements of the circuits involved have been shown to adequately describe the operations here involved.
Figure 4:
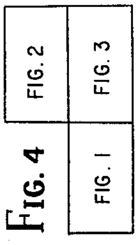
FIG. 4 shows a block diagram of how

It should be noted that the finder 240 of FIG. 1 with its associated distributor and group relays 242 has been shown in somewhat diagrammatic form and that in order to facilitate comparison, the same reference characters have been used in FIGURES 1 and 2 as in the prior Patent No. 2,849,536.

Referring to the drawings, the system here represented comprises a number of party lines such as line 101 with its #1 and #2 parties connected thereto having meter lead C191 with two meters connected thereto and terminating in the banks of a group of finder switches, each of which is part of a link including a primary selector such as 300 (FIG. 2) for setting up connections from a party line to other subscribers. I have also indicated in FIG. 1 the conductors 102 representing a second party line accessible to the same group of finders as line 101 and having associated meters connected to lead C192.

The line 101 has the two parties 1 and 2 connected in common thereto and one of the stations such as 2 has a spotter dial associated therewith assumed to send two ground impulses while the other station 1 has a spotter dial (not shown) assumed to send one ground impulse only. The same results could be accomplished by having spotter dials at each station sending different numbers of ground impulses. The line 101 terminates in the line circuit 205A which has the usual functions of marking the line in the finder and starting the finder distributor to cause the finder to seize the calling line.

As pointed out in the prior patent the selector 300 of FIG. 2 has access to called lines such as B in the same exchange through second selectors such as X315, third selectors such as X320, and connectors such as X325, and also from another level to a repeater X305 and through this repeater to the toll switch train X310 by means of which calls may be extended to distant subscribers such as B′ in other exchanges for which calls toll charges are to be assessed.

Associated with the primary selector 300 I have shown in diagrammatic form the register sender with the usual recorder 2000, detector 1900 and translator equipment 2700 used to identify a calling line in a toll call and make a record of the pertinent items of information needed to access toll. The connector X325 has the usual means for reversing the direction of current flow over a connection to a calling line when a called subscriber answers a local call.

Figure 3:
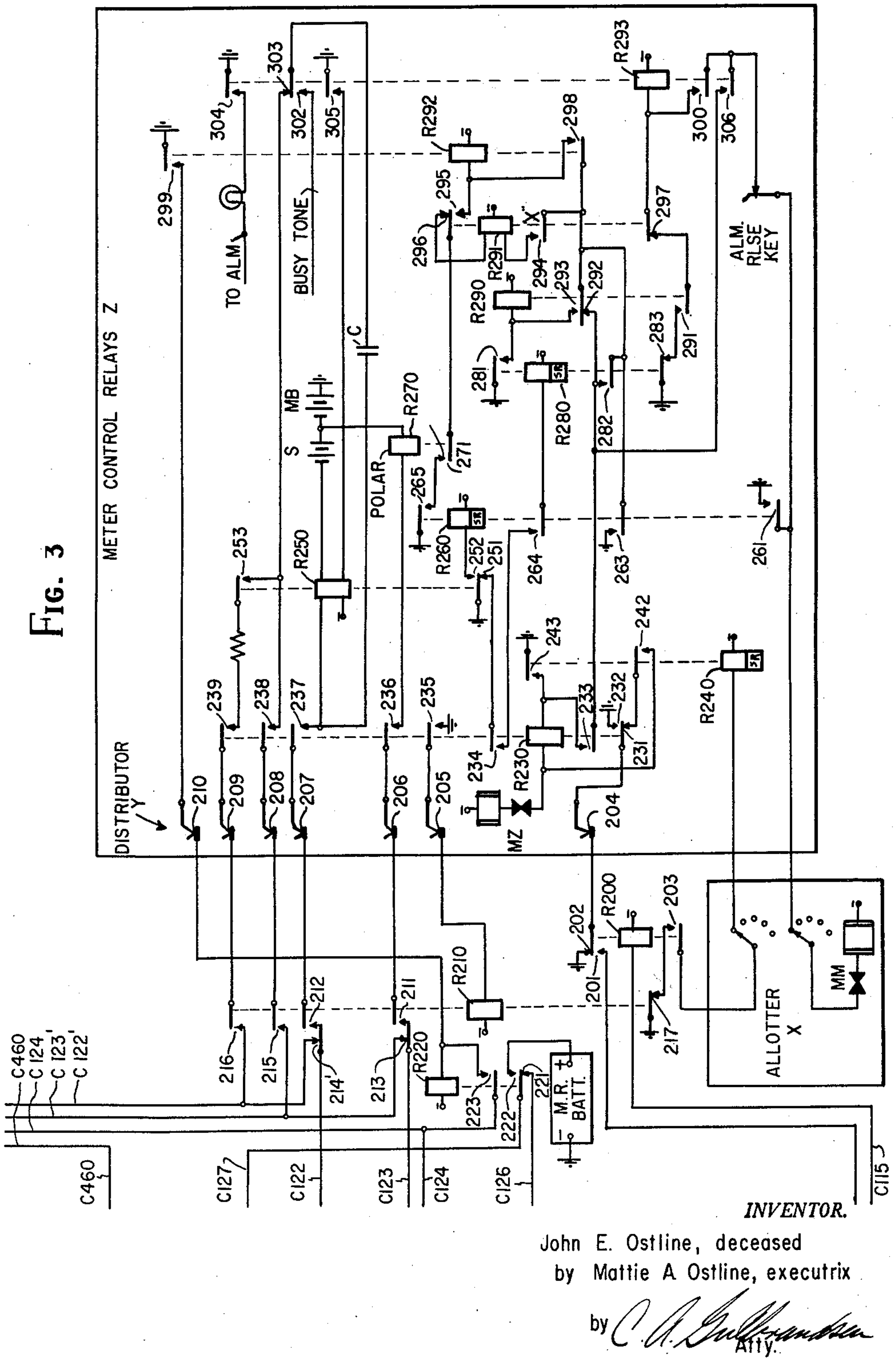
FIG. 3 shows one of the common meter control relay sets operated by the spotter dial pulses to determine the meter to be operated, and also the allotter arrangement for controlling the connection of one of these control relay sets to a finder.

I will now describe the operations involved in extending a call from a station on the party line 101 to a subscriber such as B. When such a call is initiated, the usual line relay, not shown, in the line circuit 205A, operates to apply ground to the CN lead to mark the line busy in the banks of the connector switches such as X325 in which the line appears, connects ground over lead C190 to the vertical bank contact in the bank 150 corresponding to the level in which the calling line appears, and connects negative battery through the winding of the cut-off relay (not shown) to the C contact in the bank of line finder 240 to mark the line therein. Ground is also extended from C190 to start conductor C110 of distributor 242 to energize start relay R131, which operates to cause a preselected idle one of the finder selector links to be assigned for use, and causes a preselected one of the meter control relay sets (FIG. 3) to be associated with the finder in use.

Relay R131 closes contacts 134 to energize relay R132, which in turn, at contacts 135, completes a circuit for relay R200 (FIG. 3), through wiper 105 of the rotary switch 241, which has preselected the finder 240. Relay R200 operates and at contacts 201 connects negative battery through start relay R140 of the finder to the contact 204 of the distributor Y. Relay R200 also applies ground through contacts 217 and 203 through the upper wiper of allotter X to relay R240 of the preselected meter relay set Z. Relay R240 closes its contacts to complete a stepping and test circuit as follows. Contacts 243 complete a series circuit for relay R230 and magnet MZ while contacts 242 complete a circuit from the mid point of such circuit through contacts 242 and 231, through wiper and contact 204, contacts 201 and relay R140. As long as the wiper stood on contacts connected to ground through contacts such as 202, the relay R230, would be shorted out, and magnet MZ would operate to rotate the wipers of distributor Y until a finder was found with its relay R200 energized. In this case relay R230 energizes in series with magnet MZ, which is not energized.

When relay R230 is energized, a series of operations are performed to associate the meter control relays Z with the selected finder 240 to act as a repeater during the first digit transmission and to predetermine which of the meters, party 1 or party 2, connected to lead C191 will later be operated. Contacts 232 complete an energizing circuit for relay R140 thru springs 232 and 201 and wiper and contact to start the finder to hunt for the calling line. At contacts 235 a circuit is completed for relay R210 which operates to close contacts 211, 212, 215 and 216 and open contacts 213, 214 and 217. The line circuit of the finder is thus disconnected from selector 300 and connected through contacts 211 and 212 to the upper winding of relay R250 and negative battery and through contacts 236 to relay R270. Relay R270 is a polar relay having its right hand terminal connected to the mid point between the spotter battery S and main battery M.B, which are each of approximately 50 volts, so that this relay will only energize when ground is connected via the line to its left terminal by the spotter dial and will not energize when connected in the loop circuit in series with relay R250 and the spotter battery S connected thereto. The operations of these relays will be later explained.

Relay R140, when energized over the above circuit, closed its many contacts to start the finder 240 in search of the calling line. Contacts 145 complete a circuit of stepping relay R133 through contacts 172 and 173. R133 closes springs 133′ to complete a circuit through contacts 138, 140′, 144′, and finder vertical magnet M170. M170 opens the circuit of R133 at contacts 173 and these two interact to step the finder wipers vertically until wiper 149 finds the contact 150 of the calling line. Springs 143 and 144 of relay R140 connect the test relays R136 and R137 to the C wipers 123 and 127 of the finder. Springs 141 connect test relay R138 to test wiper 149. Springs 142 are closed to complete a pre-energizing circuit from battery through the non-inductive relay R160 and over conductor C122 and springs 212, 207, and 237 to line relay R250. Contacts 146 and 247 switch relay R150 from conductor C124 and C116. Contacts 148 prepare a point in the circuit of relay R160, and contacts 141′ open a point in a circuit of motor magnet M173. Contacts 143′ and 142′ disconnect ground from busy transfer relay R130 and connect it to conductor C124 to prepare selector 300. As stated the magnet M170 operates to step the wipers until wiper 149 engages the contact marked by the calling line, and at this time R138 operates in series with magnet M170 while relay R133 is deenergized. Relay R138 opens the original circuit of magnet M170 and locks itself through relay R139 which energizes to open the vertical magnet circuit at 140′ and prepare the rotary magnet circuit at 146′. R139 also locks itself and opens R138 to now cause intermittent operation of finder rotary magnet M171 under control of R133 until the calling line is found. As soon as the switch took its first vertical step the vertical off-normal springs S176 were closed to complete a circuit for blocking relay R180 through contacts 158, 142′, 176, 193, and relay R180. This is a high voltage relay and will not operate at this time. The rotary magnet M171 continues to step the wipers until wiper 123 or 127 engages a contact such as C having battery potential as marked thereon by the calling line. At this time relay R137 will operate to open contacts 134′ to open the circuit of the rotary magnet, and closes contacts 136′ to complete the circuit of switching relay R150, when contacts 133′ close. The circuit of R150 extends from ground through 133′, 138, 146′, 136′, 146, 165, and winding of R150 to battery.

Relay R150 closes its contacts 151′, 151 and 152 to connect the meter conductor C191, now connected to wiper 124, to the conductor 127 and switches the negative and positive line conductors C122 and C123, to the wipers 121 and 122 of the finder and thence to the calling line. R150 also closes contacts 153 and 154 to prepare a locking circuit for itself to the control conductor C124 and to connect said conductor to the C wiper 123. At contacts 155, relay R150 opens a point in the circuit of the other switching relay R160 and at 156, opens a point in the rotary magnet circuit. The closure of contacts 151 and 152, connect the calling line loop through to the relays R250 and R270 (FIG. 3) through the upper winding of meter relay R190, and through the make contacts 211 and 212 of relay R210. Contacts 157 close the circuit of the lower polarizing winding of relay R190. Relay R190 does not operate at this time as the current flowing in the upper winding opposes that flowing in the lower.

As soon as the contacts 142 were closed by relay R140, line relay R250 is energized while R270 is not. This circuit from battery thru the non-inductive winding of relay R160 and contacts 142 of relay R140 was, in the prior circuit, used as a preenergizing circuit for the line relay of the selector 300 to insure that this relay started the selection of a director as soon as possible. In the present case, with the meter relays Z connected to the finder, the above circuit completes a preenergizing circuit for line relay R250. This circuit includes the battery connection of main battery at each end and the spotter battery therefore is effective to energize relay R250. Relay R250 in turn insures the preenergization of the line relay of selector 300 by closing springs 253 in the circuit of the line relay of selector 300 through wipers 208 and 209, contacts 238 and 239, and contacts 215 and 216. Springs 253 also prepare a dial tone circuit from the selector 300 thru condenser C to the calling line when such line is connected through. R250 also closes the circuit of slow acting relay R260 at 252. Relay R260 energizes and closes contacts 265 to prepare a circuit for certain relays, closes contacts 264 to prepare a circuit for R280, closes contacts 263 to complete a locking circuit for relay R230, and closes 261 to cause allotter X to preselect another meter control relay set. It will be noted that relay R240, being slow acting, held its springs 243 closed, after relay R210 opened its springs 217, until the locking circuit for R230 was closed at springs 263. It will be seen that when a calling line is found by finder 240, the contacts 157 of relay R150 also closed the circuit of motor magnet M173 of distributor 242, FIG. 1, and that as wipers 105 and 106 thereof are stepped to another finder, the circuit of relay R200 is opened at wiper 105 and that it in turn opens the circuit of relay R140 at springs 201, and R140 falls back to disconnect the distributor 242 and its control relays, from the finder 240. As relay R200 deenergizes, it also opens contacts 203 and closes contacts 202 to prepare the original circuits for controlling distributor Y in its next operation.

Referring again to the calling line 101 it will be understood that station 1 has the spotter calling device with the usual impulse springs for opening the line circuit to transmit regular impulses, and the spotter springs to ground the line once, but that station 2 has a so-called spotter dial with the usual impulse springs I and the cam S which sends two ground impulses to both sides of the line circuit, while the impulse springs I are closed, and during the transmission of the first digit. I have indicated these elements diagrammatically and it will be understood that the mechanisms for operating the same are like those shown in said prior Patent No. 2,366,647.

This dial tone circuit is connected to the calling line when R150 energizes and the loop circuit is substituted for the preenergizing circuit for relay 250 as soon as R140 falls back. The energization of the line relay of selector 300, also in the usual manner, connects holding ground to conductor C124, which holds relay R150 over contacts 154, passes over wiper 123 through contacts 153 to operate the cut-off relay, not shown, of the line circuit 205A, to open the line relay circuit thereof to in turn open the previously closed start circuits for the finder. This same holding ground on C124 supplies ground to the lower winding of R180 through 176 and 193.

As noted in my prior Patent 2,849,536, when the selector 300 is seized, a number of operations take place, such as the switching of certain contacts to extend the control conductor C124 to the conductor 305LS and through wiper 251 of sender hunter 250, and conductor 272LS to the recorder 2000. Ground is held on conductor C124 over this circuit from contacts 2172 of relay R2170.

We will now assume that a local call is being made by the number 2 party on line 101 and that this party upon hearing the dial tone, as above indicated, will operate his spotter dial to send impulses of break and make by contacts I in accordance with the various digits of the called local subscriber's number. At the same time, and during the transmission of the impulses of the first digit, the cam S will apply two impulses of ground to both sides of the calling loop for meter selection. In most spotter dials presently in use the first ground pulse is sent just prior to the first digital impulse and the second ground pulse after the first digital pulse.

As previously stated, when relays R250 and R270 are in series in the loop circuit, relay R270 does not operate as current flows in the wrong direction through its winding, from the spotter battery S. The digital impulses caused by opening and closing of springs I of the calling device operate only relay R250 by means of battery S to repeat such impulses to the selector 300 over contacts 253, 238 and 239, wipers 208 and 209, and contacts 215 and 216. During the intermittent operation of relay R250, the relay R260 is held operated due to its slow action, and relay R280 is also energized and held operated through springs 251, 234, and 264. Relay R280 opens the circuit of alarm relay R293 at springs 283, completes the circuit of R290 at contacts 281, and closes alternate contacts 282 in the locking circuit of R230. Relay R290 energizes to close springs 291 in a circuit of R293, closes 293 to complete a locking circuit and opens 292 in a holding circuit. At about this point and while the impulse springs I are closed, the ground impulses from the spotter dial cam cause two operations of relay R270, as the current is reversed and flows from exchange battery MB through polar relay R270 to ground. The first energization of R270 closes contacts 271 to complete the circuit of the upper winding of the two step relay R291. The springs 294 are X contacts and close at this time to complete a circuit for the lower winding of R291 through contacts 263 and 294 but the relay remains unoperated other than to close its X contacts. As soon as springs 271 open, after the first ground impulse, the relay R291 energizes completely through its lower winding only and prepares a circuit for relay R292 at springs 295 and opens springs 296. Upon the second immediately following ground impulse, relay R292 energizes through springs 265, 271, 284, and 295, to close its contacts 299 to complete the circuit of relay R220, and to lock itself energized at springs 298. Relay R220 operates at this time to connect the special reversed meter operating battery through springs 222 to conductor C127 to insure that the meter of party 2 of the meters for line 101 will be later operated and disconnects the regular battery circuit from the lower winding of relay R150 over conductor C126 at 221. It will be noted that each of the meters for party 1 and 2 on each line are connected through directional diodes so that each will be operated with a different direction of current flow. Relay R220 locked up to ground on the holding conductor C124 through springs 223.

Returning to the operation of relay R290 it will be noted that contacts 292 in the holding circuit of relay R230 were opened but that this circuit was held closed by the closure of contacts 282 by relay R280 during dialling of the first digit. When the line relay R250 comes to rest in its energized position after this first digit is repeated, relay R260 is held energized, but the circuit of relay R280 is opened at springs 251 long enough for relay R280 to fall back and open springs 282. The locking circuit of R230 is opened at 282 and this relay deenergizes. Relay 290 is held energized through springs 293 and 263 until later. Relay 230 opens all of its various contacts to disconnect the meter control relay set Z from the calling line and open the circuit of relay R210 which in turn switches the line circuit from these meter control relays directly to selector 300 through contacts 213 and 214. Relay R230 also opens its own locking circuit at contacts 233 and prepares the operating circuit of motor magnet MZ at springs 231. The meter control relay set distributor Y may now be operated to move the wipers 204 to 210 to another finder and may be placed in use again.

It will be noted that relays R290, R291, and R292 are held energized over the locking circuits and springs 263 until the relay R260 falls back after relay R230 has opened the contacts 237 and 236 and the line relay R250 falls back. This maintains the circuit of alarm relay R293 open at springs 297 until all three relays are unlocked.

Should the call have been initiated from station No. 1 on the party line, then only one ground or spotter impulse would have been received, and relay R270 would have been operated only once instead of twice. In this case relay R291 would have energized and locked as in the previously described call, but no second pulse would be received to operate relay R292 after R291 locked up and therefore springs 299 would not have been closed to operate relay R220 and the meter operating conductor C127 would not have been connected to the special reversed M.R. battery.

Referring to the alarm relay R293 it will be noted that in calls from either party as above described, either relay R291 alone or both R291 and R292 would be locked energized to hold the circuit of R293 open at springs 297 until this circuit is opened at 291 when R290 is released. However in case no ground pulse was received either due to a fault in a spotter dial or an attempt to call from a line without such dial, then after the dialling of the first digit and after R290 was locked up during the energization of relay R280, this relay R280 will fall back after impulses cease and close springs 283. This completes a circuit for alarm relay R293 through 283, 291, 297, and R293 to battery. Relay R293 locks to ground through springs 300, the alarm release key, and springs 261 of relay R260. R293 completes a holding ground for line relay R250 through springs 305 and a holding circuit for relay R230 thru springs 306 and 233 to lock the relays to the line which was connected to it without the spotter ground. Alarm relay R293 also opens springs 303 in the dial tone circuit, closes springs 302 to connect a busy tone to the line circuit, and closes the circuit of the alarm lamp or signal at spring 304. The whole circuit and the various locked up relays may be released by operating the alarm release key.

As described, the first digit of the called local number will be repeated by relay R250 to selector 300, and the next digits will pass directly to selector 300. The first three digits representing the called office code will be registered in the register sender equipment as indicating a local call and the register sender will be released from selector 300 in the usual manner. The call will be extended through second selector X315, third selector X320, and connector X325 to the called station B. When the called station B answers the call by removing his receiver, the connector X325 operates in the usual manner to reverse the direction of current flow in the calling line loop. This will cause a reversal of current in the upper winding of relay R190 in the finder 240 and this relay will now energize due to the aiding effect of its two windings. Relay R190 shorts its own upper winding at contacts 192 and closes 191 in the metering circuit. If the relay R220 has been locked energized by the call described, the MR battery, which is reversed to normal exchange battery, will be connected through contacts 222, 191, 151, wiper 124, conductor C191, diode 194 and meter 195 associated with party 2 of line 101. Relay R190 also opens contacts 193 in the circuit of relay R180 which will not operate in this type of call. The subscriber's meter 195 operates in the usual manner to register a local call. In case party No. 1 had called, then as described, only relay R291 would have operated and the reversal battery would not be connected up and when relay R190 operated a circuit from battery through the non inductive lower winding of R150 would be connected to the meter circuit and the meter of party No. 1 operated.

Before describing the release of the finder and other switches of this local connection I will briefly describe the operations which would have occurred in case the calling subscriber had operated his dial to extend a connection to a called party such as B' over a toll switch train. In such a case the operation of the finder and meter control relays would be the same as for a local call except that after the dialling of the digits of the office code of the directory number the register sender will have determined that the call is one for which a toll charge is to be assessed. A translator such as 2700 will be associated with the register sender and a translation of the digits will be registered in a route register, not shown, and in a coder portion thereof, also not shown. These routing digits will cause the sender to route the call by way of selector 300 over the repeated X305 and a toll switch train such as X310 to the subscriber B'.

The detector 1900 is in this case brought into use to ascertain the directory number of the calling station and R410 is connected to one of the wires in the cable C460 by the detector assigner 1910. The translator in determining whether a detector 1900 is to be required, operates, by circuits not shown, a translate relay R2701 which extends ground over one of its multiple contacts to conductor C1801 and to AB toll relay R2010 in the recorder portion. R2010 locks itself to ground over contacts 2012', and closes contacts 2017 to connect marginal detector test relay R2180 to conductor C2027 to detector assigner 1910. When detector assigner 1910 connects ground to conductor C2027 to energize relay R2180, this relay operates to close the circuit of R2170 to in turn apply a positive 90 volt battery potential to conductor 272LS through resistor 2186 and contacts 2174 in place of the ground previously applied thereto. An instant later the relay closes contacts 2173 directly to conductor 272LS through contacts 2173.

When the 90 volt battery is thus applied to C124 it extends back to the finder through relay R150 and through contacts 153 and wiper 123, through the line circuit 205A and over conductor C460 to relay R410 in the detector 1900. This high potential also extends by way of contacts 176 and 193 through the lower winding of blocking relay R180 which also now energizes, and at contacts 181, completes a by-pass circuit shunting the upper winding of meter relay R190 and opens the circuit of the lower winding thereof at 183. The operation of meter relay R190 is thus prevented in such a toll call, as relay R180 is locked energized.

When detector 1900 completes its operations, the circuit of relay R2170 will be opened and ground replaced on conductor C124 at contacts 2172. The above operations of the register sender equipment are not important in the operation of the present disclosure other than to show that the meter operating devices are rendered inoperative in a toll call and further detailed operations thereof can be ascertained from the description in the application of Coleman, Serial No. 487,500 filed February 11, 1955, now U.S. Patent Number 2,938,957, granted May 31, 1960, and the Coleman Patent No. 2,773,127 issued December 4, 1956.

Returning now to the release of any of the type connections described, it will be noted that the replacement of the handset of the calling or called subscriber will initiate the usual operations resulting in the release of primary selector 300 which in turn removes ground from the holding conductor C124 to open the holding circuits for the various relays such as R150 in the finder and the cut-off relay in line circuit 205A. When relay R150 restores it opens its various contacts, such as 151' in the meter circuit, 151 and 152 in the line circuit, 153 in the holding conductor circuit, 157 in the locking circuit of R180, and 154 in its own locking circuit. R150 also completes, at contacts 158, the circuit of release magnet M172, which extends through vertical off-normal contacts 175 so that the circuit will be held closed until the finder is completely released.

It will therefore be seen that I have provided meter selecting or determining equipment common to the finder switches of an automatic telephone system, one of which is allotted to a finder switch in each connection, only during the dialling of the first digit of the called number by a calling subscriber, to operate equipment in the associated finder switch to determine the meter to be operated when that call is completed.

Having fully described and ascertained the features and aspects of my invention, what I consider to be novel and desire to have protected by Letters Patent, will be pointed out in the appended claims.

What I claim is:

1. In an automatic telephone system, a plurality of subscriber lines, a plurality of stations on each line, a meter for each station on a line associated with the line, a plurality of finder switches common to said lines, means for operating a finder switch to seize a line when a call is initiated by one of the parties thereon and for sending impulses thereover to extend a connection from a line, a plurality of sets of meter control relays common to said plurality of lines and finder switches, means operated responsive to the seizure of a line finder switch for connecting an idle one of said common sets to the operated finder switch, a meter determining relay in the finder switch for determining which of the meters of the calling line is to be operated, means in the common relay set selectively operated during the sending of impulses over said finder, dependent upon the party on the line which is making the call, said last means controlling the meter relay in the finder switch to determine the meter to be operated, and means for then disconnecting the common set from the operated finder switch and for later operating the determined meter.

2. An automatic telephone system such as claimed in claim 1 in which one of the common meter control relay sets is associated with the finder switch only during the dialling of the first digit of a called number.

3. An automatic telephone system such as claimed in claim 1 in which one of the parties on a calling line has a special calling device having means for sending special impulses to the meter control relay set associated with the finder in use, and means in the relay set controlled by said special impulses during the dialling of the first digit of a called number for controlling the meter determining relay in the finder to determine that only the meter of the calling party will be operated.

4. In an automatic telephone system, a plurality of lines, a plurality of parties on each line, a plurality of finder selector links common to said lines, means responsive to the initiation of a call by one of the parties on a line for causing the finder of an idle one of said links to seize the calling line, a plurality of meter control relay sets common to said links and to said plurality of lines, means for causing one of said relay sets to be inserted in the connection between the finder and the selector of the link connected to the calling line, means in the inserted relay set operated responsive to the transmission of the impulses over the calling line corresponding to the first digit of a called number for repeating said impulses to the associated selector over a portion of the link circuit to extend a connection thereover, detecting means in said relay set operated during the repeating of said impulses of the first digit to register the party on the line making the call, means in the finder selectively operated dependent upon the operation of said detecting means in the relay set to select the meter corresponding to the party calling, and means for disconnecting said relay set from the link when the impulses of the first digit have been repeated, and for thereafter operating the selected meter.

5. A telephone system such as claimed in claim 4 in which one of the parties on the calling line has means for sending ground impulses over a part of the link to said relay set while it is inserted in the link circuit, and means in the relay set operated in response to said ground impulses to in turn control the means in the finder switch to predetermine the operation only of the meter of the calling party.

6. In an automatic telephone system, a party line, a link circuit comprising a finder and a selector connected together and connected to said line when a call is made by a party on said line, means for transmitting impulses corresponding to the digits of a called number over said link circuit, a meter for each party on the line, a combined repeating and detecting circuit, means for inserting said combined circuit in the link circuit between the finder and the selector only during the dialling of the first digit of a called number, means in said combined circuit operated while the circuit is inserted in said link circuit for receiving and repeating the impulses of said first digit to the selector over a portion of said link circuit to thereby operate the selector to extend a connection toward the called line, additional means in said combined circuit also operated during the transmission of the impulses of said first digit to register the party calling, means in the finder for determining which of said meters is to be operated, said last means controlled by the operation of said additional means in the combined circuit to determine the operation of the meter of the calling party.

7. In a telephone system, a subscriber line having a pair of parties thereon, a meter for each party, a link comprising a finder and a selector connected together, means controlled by the initiation of a call by one of the parties on the line for operating said finder switch to connect said link to the line, a meter control relay set common to a plurality of said links and to a plurality of said lines, means controlled in the operation of the finder in seizing said line for temporarily connecting said relay set to the finder, means on the calling line for transmitting impulses corresponding to the digits of the called number over said line and link, repeating and detecting means in said relay set, means in the finder operated when the relay set is connected to the finder for disconnecting the selector from the finder and connecting said repeating and detecting means between the finder and the selector, said repeating means operated by the receipt of the impulses corresponding to the first digit of a called number to repeat said impulses to the selector, said detecting means also seslectively operated dependent upon the party calling while said impulses corresponding to said first digit are being transmitted, means in the finder for determining which meter is to be operated, said last means operated from the detecting means in accordance with its selective operation to register said determination in the finder, and means for disconnecting said relay set from the finder when the impulses of said first digit have been repeated.

8. A telephone system such as claimed in claim 7 in which one of the parties on said line has a special calling device which transmits ground impulses during the transmission of the impulses of said first digit, and in which said detecting means is operated by said ground impulses to control the determining means in the finder.

9. A telephone system such as claimed in claim 7 in which each of the parties on the line has a special calling device which transmits ground impulses during the transmission of the regular impulses of a first digit, and in which said detecting means includes means operated by said ground impulses to control the determining means in the finder.

10. A telephone system such as claimed in claim 9 in which there is an alarm circuit in said detecting means and in which there is means in the detecting means operated in case no ground impulses are received, for completing said alarm circuit.

11. In a telephone system, a subscriber line having a pair of parties thereon, a meter for each party, switching means connected to the line when a call is initiated by one of the parties on the line, a meter selecting means, means for operating said switching means to extend a connection therefrom, means for temporarily associating said meter selecting means with the switching means during its operation, a special dial associated with each party on the line having means for sending special meter selecting impulses over the line in addition to the regular impulses for operating the switching means, means in said selecting means, operated by said special impulse, while the selecting means is associated with the switching means, for determining which of the meters is to be operated, means in the switching means for registering said determination and releasing said meter selecting means before the connection is completed, an alarm arrangement in said meter selecting means, and means operated in case no special meter selecting impulses are received by the selecting means, while associated with the switching means, for operating said alarm means.

12. A telephone system such as claimed in claim 11 in which there is means controlled by the operation of said alarm means for preventing the release of said switching means.

References Cited in the file of this patent

UNITED STATES PATENTS

| | | |
|---|---|---|
| 2,332,015 | Scheer | Oct. 19, 1943 |
| 2,410,520 | Ostline | Nov. 5, 1946 |
| 2,468,429 | Dehn et al. | Apr. 26, 1949 |
| 2,619,546 | Myers | Nov. 25, 1952 |